United States Patent [19]
Brinton

[11] Patent Number: 5,125,181
[45] Date of Patent: Jun. 30, 1992

[54] FISH STRIKE DETECTOR

[76] Inventor: David N. Brinton, P.O. Box 259, Jackson, Wyo. 83001

[21] Appl. No.: 772,424

[22] Filed: Oct. 7, 1991

[51] Int. Cl.$^5$ .................... A01K 85/01; A01K 75/02
[52] U.S. Cl. ................................ 43/17; 43/17.5; 43/16
[58] Field of Search .............. 43/17, 15, 16, 17.1, 43/17.5

[56] References Cited

U.S. PATENT DOCUMENTS

| | | | |
|---|---|---|---|
| 3,882,629 | 5/1975 | Kaye | 43/17 |
| 4,399,630 | 8/1983 | Lawes | 43/17 |
| 4,458,437 | 7/1984 | Ou | 43/17 |
| 4,479,321 | 10/1984 | Welstead | 43/17 |
| 4,541,196 | 9/1985 | Jershin | 43/17 |
| 4,766,688 | 8/1988 | Hiles | 43/17 |
| 4,905,398 | 3/1990 | Botbyl | 43/17 |
| 4,930,243 | 6/1990 | Lowe et al. | 43/17 |

Primary Examiner—Richard K. Seidel
Assistant Examiner—Chuck Y. Mah
Attorney, Agent, or Firm—Kinney & Lange

[57] ABSTRACT

The present invention relates to a fish strike detector assembly for attachment to a fishing rod. The assembly includes an electrical circuit to detect and indicate a fish strike. The circuit includes a tilt switch having a frame with two contacts on the frame and having a bridging element moving by gravity and carried by the frame toward and away from electrical contact with the contacts as the frame is tilted in each of two directions. A delay circuit may be electrically coupled to the tilt switch to eliminate false alarms due to waves or boat rocking. An indicator is electrically coupled to the delay switch. A power supply is electrically coupled to the tilt switch in the circuit providing electrical power to the circuit. A rod clamp directly mounts the assembly securely to the fishing rod. The rod clamp has a first part and a second part fastened together near a first end of each. Each part has near a second end a raised portion on an inner surface. The second part also has a grooved portion on the inner surface. The first part and the second part are positioned such that the inner surface of the first part faces the inner surface of the second part. A fishing rod is inserted and fixedly held therebetween by compression forces exerted by the first and second parts. A housing having a base plate is pivotally attached near a center region to the rod clamp, substantially against the first part of the rod clamp, by a pivot device. The housing provides a mounting surface for mounting the electrical circuit and is capable of being rotated about the pivot device so as to provide adjustable leveling for the tilt switch.

19 Claims, 3 Drawing Sheets

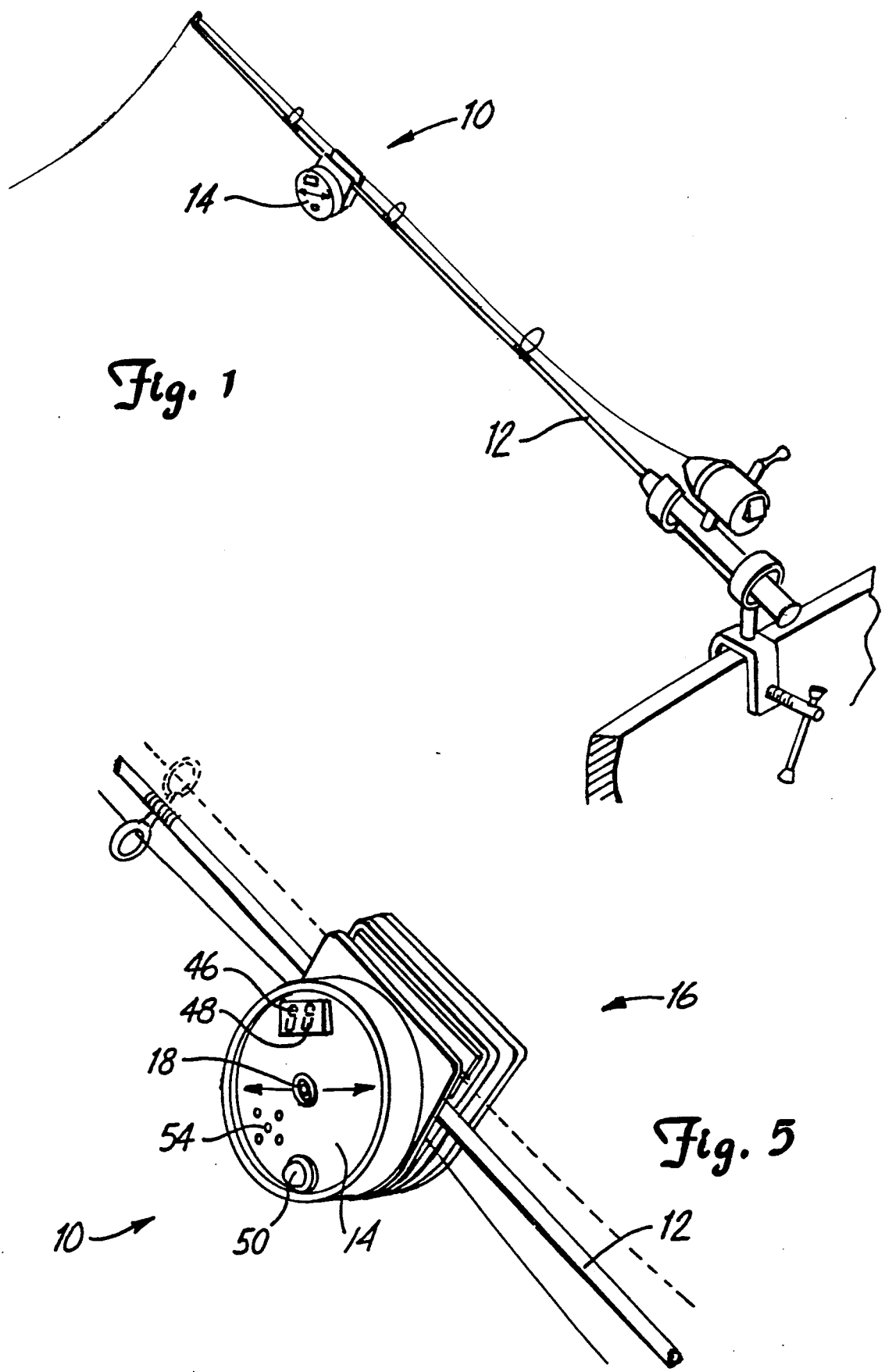

FISH STRIKE DETECTOR

BACKGROUND OF THE INVENTION

The present invention relates generally to a fish strike detector. In particular, the present invention is a fish strike detector having an electrical circuit mounted in a housing pivotally attached to a rod clamping device.

Anglers have long hand-held their fishing rod or pole while fishing and relied on either physical sensation or sight to determine when a fish is biting or striking. A fish biting the bait on a hook disturbs an attached fishing line which in turn is attached to the fishing pole in some manner. When the bite is hard enough or if the fish swims away with the bait, the fishing line becomes taut and tends to bend or flex the upper or tip section of the fishing rod. The angler then hopefully sets the hook and reels in the fish.

Typically, anglers must pay close attention to their fishing rod in order to maximize the number of fish caught within a given period of time. However, an angler using a single pole may at times desire to place the pole in a holder or prop up the rod in some fashion so as to avoid constantly holding the pole, thus having to accept the reduction in the ability to quickly detect a fish strike.

An individual angler may increase the number of fish taken within a given period of time by increasing the number of fishing poles used. However, increasing the number of fishing poles also increases the chance of not detecting a fish strike on a particular pole due to the angler's divided attention among the other fishing poles, especially if the poles are positioned some distance apart. Also, fishing at night, whether with a single pole or multiple poles, produces a special problem in that visual contact with the fishing line or fishing pole is impaired.

To overcome such problems as those described above, fish strike detectors have been developed with both audio and visual indicators to aid in the detection of fish strikes when the pole is not hand-held.

One such indicating device is mounted near a midpoint of the fishing rod. The device is activated by the flexing of the fishing rod which occurs during a strike. The device includes a mercury switch fixed at a predetermined angle on a circuit board and is coupled to an audio and/or visual indicator(s). As the fishing pole flexes, tilting the switch, gravity causes the mercury bubble or bridging element within the switch bulb or frame to seek a new position therein. If the mercury bridging element travels far enough, the mercury bridging element completes an electrical circuit by coming into contact with at least two electrical contacts positioned within the switch bulb, thus activating the coupled indicator. However, such an arrangement requires that the fishing pole be held in a special rod mount at a predetermined angle after casting so that the proper resting position of the mercury switch is maintained.

In another such device, a small battery operated light is attached through a mercury switch to a pin light battery and mounted in a cylindrical casing which is attached to a bracket by using a bolt and wing nut. The bracket is then attached near the tip of the fishing pole by tightening a bolt-nut arrangement passing through both the bracket and a clamp. The function of such a device is highly dependent upon being able to keep the two bolt-nut arrangements securely tightened. Adjusting this device is somewhat cumbersome because once the thumb nut is loosened, the casing is free to rotate to the full extent of its travel. Furthermore, such a design will likely require readjustment after every cast due to the torque applied at the pivot points during each cast.

SUMMARY OF THE INVENTION

The present invention is a fish strike detector assembly for attachment to a fishing rod. An electrical circuit senses and indicates when a fish strikes. The circuit includes a tilt switch, such as a mercury switch, having a frame with two contacts on the frame and having a bridging element moving by gravity and carried by the frame toward and away from electrical contact with the contacts as the frame is tilted in each of two directions. An indicator, such as an LED or buzzer, is electrically coupled to a tilt switch and is used to indicate the detected fish strike. A delay circuit may also be incorporated which may be adjusted to delay the mercury switch from being activated for an adjustable number of seconds before activating the indicator. This will eliminate false alarms due to wave action and boat rocking, if desired. A power supply is coupled to the tilt switch and indicator for providing electrical power to the circuit.

A rod clamping device directly mounts the assembly securely to the fishing rod. The rod clamping device has a first part and a second part fastened together near a first end of each. Each part has a raised portion on an inner surface near second ends of the parts. The second part has a grooved portion near the second end of its inner surface. The first part and the second part are positioned such that the inner surface of the first part faces the inner surface of the second part. The fishing rod is inserted therebetween and held securely by the compression forces exerted by the first and second parts in a "clothespin"-like action.

A housing having a base plate is pivotally attached near a center region of the base plate to the rod clamping device, substantially against the first part of the rod clamping device, by a pivot device such as a rivet, bolt or screw. The housing provides a mounting surface for mounting the electrical circuit, and is capable of being rotated about the pivot device so as to provide adjustable leveling for the tilt switch.

BRIEF DESCRIPTION OF THE DRAWINGS

FIG. 1 is a perspective view showing the fish strike detection in operation on a fishing rod;

FIG. 5 is perspective view of the fish strike detector to show the position of the LED and buzzer.

DETAILED DESCRIPTION OF THE PREFERRED EMBODIMENTS

A fishing rod or pole which includes a fish strike detector in accordance with the present invention is illustrated in FIG. 1. The fish strike detector 10 is positioned near the upper region of fishing rod 12. The fishing rod 12 is either propped up or placed in a rod holder following casting of the fishing line into the water. Following the positioning of the rod in a rod holder or against a prop device, the sensitivity of the fish strike detector 10 is adjusted by rotating the sensitivity adjustment casing 14 until the desired amount of flexing in the upper region of the rod 12 causes the fish strike detector 10 to be activated. The sensitivity of the fish strike detector 10 need not be readjusted after subsequent casts, so long as the fishing rod 12 is positioned following the cast at an angle substantially equal to the previous angular position of the fishing rod. However, the sensitivity adjustment casing 14 provides a continuous adjustment range of 180 degrees in either direction with respect to the present setting, if the angler so desires.

Figure 2:
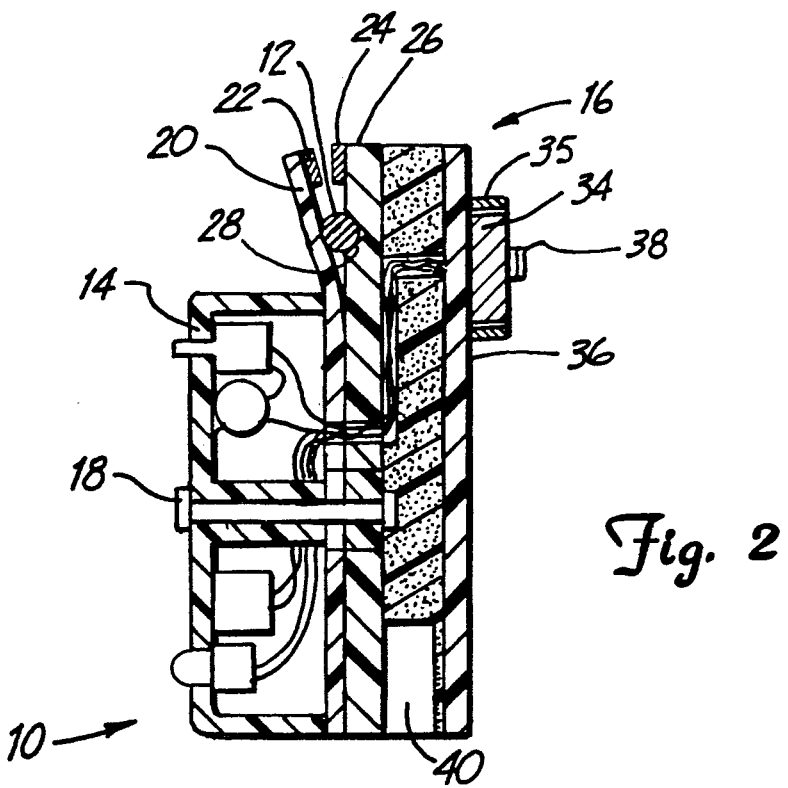
FIG. 2 is a cross-sectional view of the fish strike detector.

The sensitivity adjustment casing 14 is a unitary body having a circular base approximately 2 inches in diameter with a cylindrical side wall approximately ½ inch extending therefrom and attached thereto. The sensitivity adjustment casing 14 and the rod clamp 16 are positioned with the cylindrical sidewall of the sensitivity adjustment casing 14 contacting a surface of the rod clamp 16, as shown in FIG. 2. A hole near the center of the sensitivity adjustment casing 14 allows the casing 14 to be pivotally attached to the rod clamp 16 by pop rivet 18. Pop rivet 18 is inserted into the hole in the sensitivity adjustment casing 14, extends through the rod clamp 16 and securely holds sensitivity adjustment casing 14 substantially against the rod clamp 16. The pop rivet 18 provides a pivot axle around which the sensitivity adjustment casing 14 can be rotated.

The rod clamp 16 directly mounts the fish strike detector assembly 10 securely to the fishing rod 12. The rod clamp 16 is constructed from two sheets of 0.06 inch thick styrene plastic sheeting, each approximately 2¼ inches in length and 2 inches in width. A first sheet 20 has a raised region 22 which generally corresponds to the raised region 24 on the second sheet 26. The second sheet 26 has a grooved region 28 into which rod 12 is placed and held. The first sheet 20 and the second sheet 26 are held together with pop rivets 30 as shown in FIG. 3, the total assembly weighing approximately 1.5 ounces.

Figure 3:
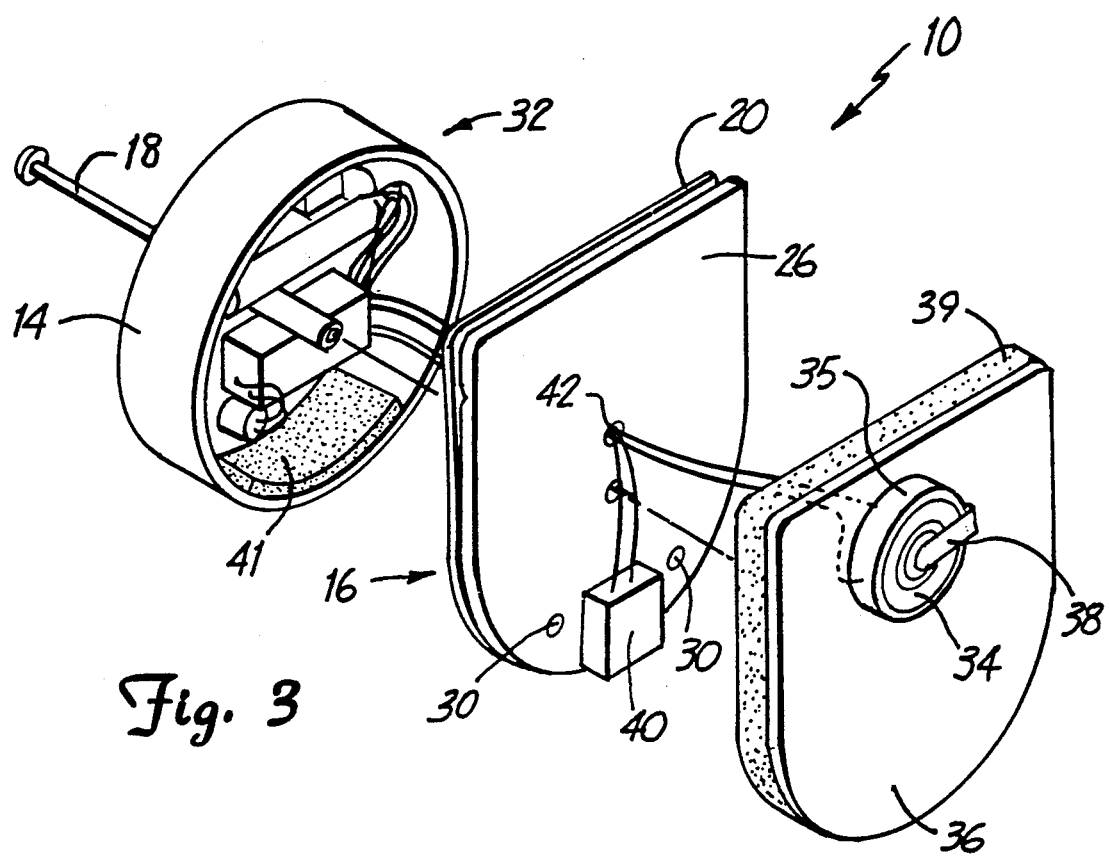
FIG. 3 is an exploded perspective view of the fish strike detector.

FIG. 3 shows an exploded view of the fish strike detector 10. A battery 34, such as a 3 volt Duracell DL2430 battery, is mounted in a battery mount 35 attached to a third sheet 36, third sheet 36 also comprising 0.06 inch thick styrene plastic sheeting. A battery clip 38 holds the battery 34 in battery mount 35 substantially against third sheet 36. An external jack 40 is shown mounted to the second sheet 26. Electrical wires coupled to battery 34 and external jack 40 pass through a hole 42 in the rod clamp 16 and attach to electrical components of electrical circuit 32. The electrical circuit 32 is shown mounted inside the sensitivity adjustment casing 14. A styrofoam flotation layer 39 is attached to the third sheet 36 so as to provide flotation for the fish strike detector assembly 10 so that it will float in water. A second flotation device 41 made of similar material can be placed in the sensitivity adjustment casing 14 if additional flotation is desired. These flotation devices may be replaced with an airtight chamber, with a sealed conduit for electrical wires, if desired. The sensitivity adjustment casing 14 also provides a mounting surface for electrical circuit 32 which is mounted thereto.

Figure 4:
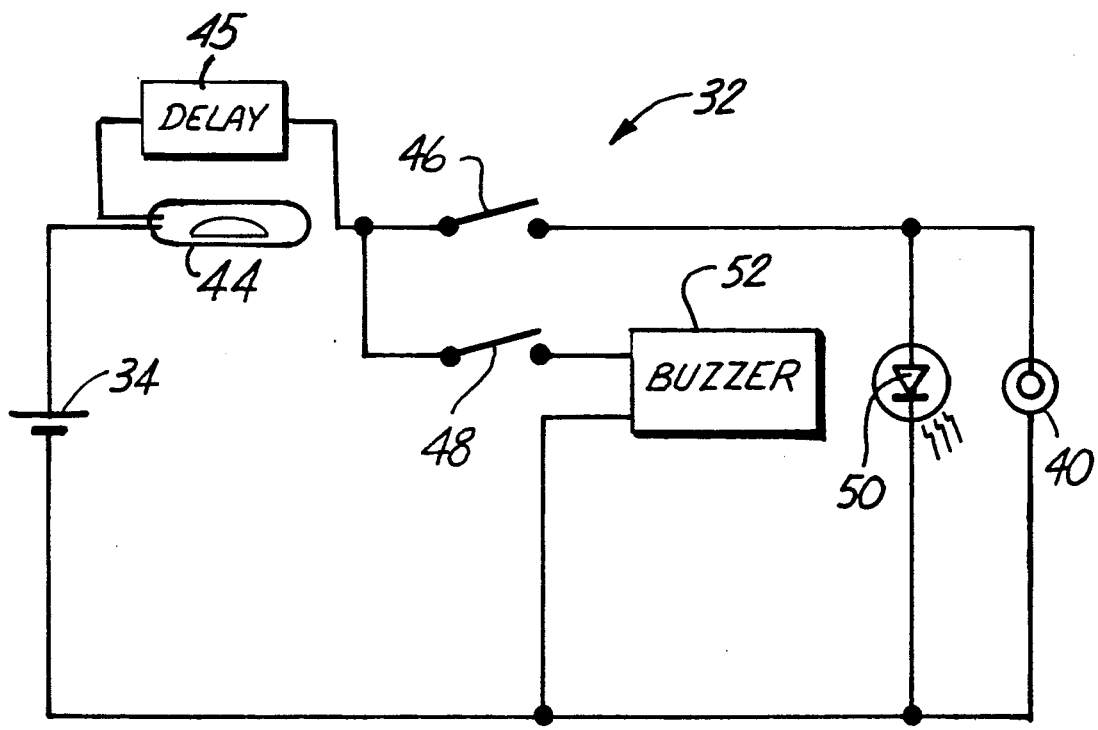
FIG. 4 is a circuit diagram of the fish strike detector.

FIG. 4 is a schematic diagram of the electrical circuit 32. The positive terminal of battery 34 is coupled to a first terminal of mercury switch 44 and a second terminal of mercury switch 44 is then coupled to a first terminal of a time delay circuit 45. The time delay circuit 45 is then coupled to the first terminal of LED enable switch 46 and a first terminal of buzzer enable switch 48. A second terminal of LED enable switch 46 is coupled to the anode of LED 50 and the cathode of LED 50 is coupled to the negative terminal of battery 34. A second terminal of buzzer enable switch 48 is coupled to a first terminal of buzzer 52 and a second terminal of buzzer 52 is coupled to the negative terminal of battery 34. A first terminal of external jack 40 can be coupled to the second terminal of either the LED enable switch 46 or the buzzer enable switch 48, but is shown in FIG. 4 connected to LED enable switch 46. A second terminal of jack 40 is coupled to the negative terminal of battery 34.

FIG. 5 shows LED enable switch 46, buzzer enable switch 48, and LED 50 mounted to the sensitivity adjustment casing 14. LED enable switch 46 and buzzer enable switch 48 are accessible from the outside of the fish strike detector 10. LED 50 provides an external visual indication of a detected fish strike. A grouping of holes 54 in the sensitivity adjustment casing 14 allow sound waves emitted from the internally mounted buzzer 52 to escape from inside the sensitivity adjustment casing 14.

The present invention provides an improved fish strike detector for mounting to a fishing rod. The fish strike detector is simple to construct and simple to use. The device is designed to be attached to the fishing pole near the tip section. The device can be positioned on the pole so that the LED can be seen from either side of the pole. The sensitivity adjustment casing can be rotated 180° in either direction to allow leveling of the tilt switch relative to any angle of the fishing rod placement. Sensitivity can be adjusted easily and wind factors can be mostly eliminated. It can be used while still fishing, trolling, drift fishing, on a down rigger or any time the pole is not hand-held and observation in close proximity to the fishing pole is not feasible or desired. A flotation device allows the fish strike detector to float should the fish strike detector be inadvertently dropped into the water. The strike detector should be removed for distance casting but it need not be removed for short casts or vertical fishing. Removing the strike detector for distance casting is easily done, and quickly reattachable without having to change the adjustable angle of the detector. The external jack 40 provides for the option of plugging in a remote unit that utilizes its own power source with visual and audio alarms, and is activated by closure of the mercury switch 44. This remote unit would allow fisherman to be out of sight or sound from the strike detector mounted on the rod. Thus the fish strike detector of the present invention provides an improved device for detecting a fish strike or bite.

The time delay circuit is not essential, but is desirable to reduce the likelihood of false alarms. A three second delay that requires the mercury switch to be on for that length of time is adequate. The time delay can be adjustable from zero to several seconds.

Although the present invention has been described with reference to preferred embodiments, workers skilled in the art will recognize that changes may be made in form and detail without departing from the spirit and scope of the invention.

What is claimed is:

1. A fish strike detector assembly for attachment to a fishing rod comprising:
   an electrical circuit to detect and indicate a fish strike, the circuit having components including a tilt switch having a frame with two contacts on the frame and having a bridging element movable by gravity and carried by the frame toward and away from electrical contact with the contacts as the frame is tilted in each of two directions, indicator means electrically coupled to the tilt switch, and connector means for coupling a power supply to the tilt switch and indicator means for providing electrical power to the circuit;

rod clamping means for directly mounting the assembly securely to the fishing rod, the rod clamping means having a first part and a second part, the first part being attached to the second part near a first end of each part, the second part having a grooved portion adjacent the second end in the inner surface thereof, the first part and the second part being positioned such that the inner surface of the first part faces the inner surface of the second part, the fishing rod being inserted and fixedly held therebetween by compression forces exerted by the first and second parts; and a housing having a base plate pivotally attached near a center region to the rod clamping means substantially against one of the parts of the rod clamping means by pivot means, the base plate being of peripheral size to be substantially within the periphery of the one part of the rod clamping means and having an edge adjacent the grooved portion in the rod clamping means, the housing providing a mounting surface mounting the electrical circuit components and being capable of being rotated about the pivot means so as to provide adjustable leveling for the tilt switch.

2. The apparatus of claim wherein the tilt switch comprises a mercury switch.

3. The apparatus of claim 1 and including a delay circuit.

4. The apparatus of claim and further including flotation means mounted to a portion of the rod clamping means for causing the assembly to float when in water.

5. The apparatus of claim 4 and further including battery holder means mounted to an outer portion of the fish strike detector assembly for mounting a battery for electrically coupling to the connector means.

6. The apparatus of claim 5 wherein the flotation means comprises styrofoam.

7. The apparatus of claim wherein the electrical circuit further includes an ON-OFF switch electrically coupled by a first terminal to the tilt switch and by a second terminal to the indicator means to deactivate the indicator means regardless of the position of the bridging element in the tilt switch.

8. The apparatus of claim 7 wherein the indicator means comprises an LED.

9. The apparatus of claim 7 wherein the indicator means comprises an electrical buzzer.

10. The apparatus of claim 7 wherein the second part of the clamping means has an external electrical jack mounted thereto, the jack being electrically coupled to the second terminal of the ON-OFF switch.

11. The apparatus of claim I wherein the housing comprises a unitary body having a circular base plate with a cylindrical side wall attached thereto.

12. The apparatus of claim 11 wherein the housing has a flotation means attached thereto.

13. The apparatus of claim 12 wherein the flotation means is comprised of styrofoam and an airtight chamber between casing and rod clamp.

14. A fish strike detector assembly for attachment to a fishing rod comprising:

an electrical circuit to detect and indicate a fish strike, the circuit having circuit components including a tilt switch having a frame with two contacts on the frame and having a bridging element movable by gravity and carried by the frame toward and away from electrical contact with the contacts as the frame is tilted in each of two directions, indicator means is electrically coupled to the tilt switch, and a battery coupled to the tilt switch and indicator means for providing electrical power to the circuit;

rod clamping means for directly mounting the assembly securely to the fishing rod, the rod clamping means having a first part and a second part fastened together near a first end of each, the second part having a grooved portion in the inner surface thereof adjacent the second end. the first part and the second part being positioned such that the inner surface of the first part faces the inner surface of the second part, the fishing rod being inserted and fixedly held therebetween by compression forces exerted by the first and second parts; and a unitary body having a circular base with a cylindrical sidewall attached thereto pivotally attached near a center region of the circular base to the rod clamping means substantially against the first part of the rod clamping means by pivot means thereby forming an enclosure for the electrical circuit, the unitary body providing a mounting surface mounting the electrical circuit components and being capable of being rotated about the pivot means so as to provide adjustable leveling for the tilt switch;

battery holder means for mounting the battery;

a first ON-OFF switch electrically coupled by a first terminal to the tilt switch and by a second terminal to a visual indicator means to deactivate the visual indicator means regardless of the position of the bridging element in the tilt switch;

a second ON-OFF switch electrically coupled by a first terminal to the tilt switch and by a second terminal to an audio indicator means to deactivate the audio indicator means regardless of the position of the bridging element in the tilt switch.

15. The apparatus of claim 14 wherein the tilt switch comprises a mercury switch.

16. The apparatus of claim 14 and including a delay circuit.

17. The apparatus of claim 14 wherein the second part of the clamping means has an external electrical jack mounted thereto, the jack being electrically coupled to the second terminal of an ON-OFF switch means.

18. The apparatus of claim 17 wherein the unitary body has flotation means coupled thereto.

19. The apparatus of claim 18 wherein the flotation means comprises styrofoam.

* * * * *

UNITED STATES PATENT AND TRADEMARK OFFICE
CERTIFICATE OF CORRECTION

PATENT NO. :  5,125,181
DATED      :  June 30, 1992
INVENTOR(S):  DAVID N. BRINTON It is certified that error appears in the above-identified patent and that said Letters Patent is hereby corrected as shown below:

Col. 5, line 33, delete "claim", insert "claim 1"

Col. 5, line 37, delete "claim", insert "claim 1"

Signed and Sealed this

Twenty-fourth Day of August, 1993

Attest:

BRUCE LEHMAN

Attesting Officer

Commissioner of Patents and Trademarks